United States Patent
Nocera

(12) 
(10) Patent No.: US 6,193,518 B1
(45) Date of Patent: Feb. 27, 2001

(54) METHOD FOR DEVELOPING ANSWER-OPTIONS TO ISSUE-QUESTIONS RELATING TO CHILD-DEVELOPMENT

(76) Inventor: Tina M. Nocera, 66 Union Ave., Nutley, NJ (US) 07110

( * ) Notice: Subject to any disclaimer, the term of this patent is extended or adjusted under 35 U.S.C. 154(b) by 0 days.

(21) Appl. No.: 09/197,156

(22) Filed: Nov. 20, 1998

(51) Int. Cl.⁷ .............................. G09B 19/00; G09B 3/00; G09B 7/00
(52) U.S. Cl. ............................................ 434/236; 434/322
(58) Field of Search .................................... 434/236, 237, 434/238, 322

(56) References Cited

PUBLICATIONS

Marks, "We Have a Problem", Educational Record pp. 55–59, Jun. 1991.*
Gruner & Jahr USA Publishing, www.parents.com, Dec. 1997.*
Lisa Connors McDonough, "We Started It!", Child, Dec. 1997.*
Nancy Samalin, Catherine Whitney, "Why Can't I?", Parents, Oct. 1997.*
Anthony E. Wolf, Ellen H. Parlapiano, "Age–by–Age Guide to Bad Habits"Child, Aug. 1996.*
Margery D. Rosen, "Discipline Workshop: 'Our 4–Year–Old Uses Profanity'" Child, Aug. 1996.*
Relevant Web Site: www/webmd.com—Reference Article "The importance of parents' concerns about their child's development". Author: Glascoe FP; Altemeier WA; MacLean WE (Jul. 31, 1989).

* cited by examiner

Primary Examiner—John Edmund Rovnak
(74) Attorney, Agent, or Firm—Ernest D. Buff & Associates LLC; Ernest D. Buff

(57) ABSTRACT

Information concerning child development is developed and stored in first and second data sets containing topics and issue-questions related thereto. The information is accessed from these data sets by selectively combining an issue-question with at least one topic to produce a primary information product. A program means associated with the data sets modifies the primary information product by imposing thereon a plurality of answer-options to the selected issue-question. Each of the answer-options comprises at least one expert opinion and one parent-expert opinion, stored in third and fourth data sets. The imposition of answer-options on the information product produces a polycentric information product, which is readily communicated by oral, written or electronic means. Advantageously, the method provides to a parent, grandparent, child, teacher, nurse, caregiver, baby-sitter, or other user or viewer, an information product that is directed specifically to the concerns of that user. The polycentric information product may be presented to the user via a computer, television, video-tape, digital-video-disk (DVD), CD-ROM, a newsletter, and other oral and written communication means, electronically or otherwise.

20 Claims, 3 Drawing Sheets

METHOD FOR DEVELOPING ANSWER-OPTIONS TO ISSUE-QUESTIONS RELATING TO CHILD-DEVELOPMENT

BACKGROUND OF THE INVENTION

1. Field of the Invention

The present invention relates to a method of providing at least one answer-option to a specific issue-question relating to child-development. The answer-option is preferably comprised of an expert opinion and a parent-expert opinion of the issue-question.

2. Description of the Prior Art

Child-rearing and development today presents challenges somewhat different than those addressed by our parents and grandparents. Previous generations could rely on a large familial support system (i.e., the nuclear family) for help with child-rearing and other family issues. Today's caregivers, including parents, nannies, baby-sitters, teachers, nurses, and the like, do not enjoy the benefits afforded by this singular resource for valuable advice. A particularly advantageous feature provided by the nuclear family, and frequently missing today, is the ability to solicit and consider a variety of views on a particular issue—views that come from personal experience, subject matter experts (i.e., grandparents), and various other sources. This opportunity for consideration of divergent views on an issue better equips the caregiver to develop an informed decision on how best to handle that issue.

Information is presently available for a wide variety of child-rearing and development issues. The quantum of literature addressing these issues becomes readily apparent upon perusal of library or bookstore shelves. Some of the literature deals with specific issues in excruciating detail (e.g., toilet training). Other literature addresses a whole host of subjects (e.g., the toddler years). A major problem with such literature is the tendency for presentation of singular points of view, typically the authors'. These one size fits all presentations do not apply to child-rearing and development. For this endeavor, numerous views concerning each issue afford far greater value to the care-giver. Literature references which are comprehensive enough to address the numerous issues important to each care-giver, and which offer a variety of views on these important issues, i.e., a "child's user guide", are virtually non-existent owing to the myriad of variables involved.

There remains a need in the art for a method and means for providing caregivers with access to multi-facetted points-of-view for the child-rearing and development issues that are most important to the caregivers.

SUMMARY OF THE INVENTION

The present invention provides a method for providing to a user answer-options to issue-questions relating to child development. The method comprises the steps of identifying a plurality of topics relating to child development based upon predetermined criteria; developing and recording a plurality of issue-questions directed to each of the identified child development topics; developing and recording an expert opinion for each issue-question; developing and recording a parent-expert opinion for each issue-question; selecting a topic; selecting an issue-question directed to the selected topic; and communicating a plurality of answer-options to the selected issue-question, the plurality of answer-options comprising at least one expert opinion and one parent-expert opinion and being communicated orally, in writing, or electronically. The present invention may be used with or without the aid of a general purpose computer.

In another aspect of the present invention, information concerning child development is developed and stored as at least one database (obviously, more than one database may also be used in connection with the present invention) in a memory storage device of a general purpose computer as first and second data sets containing topics and issue-questions related thereto. The information is accessed from these data sets by selectively combining an issue-question with at least one topic to produce a primary information product. A program means associated with the data sets modifies the primary information product by imposing thereon a plurality of answer-options to the selected issue-question. Each of the answer-options comprises at least one expert opinion and one parent-xpert opinion, stored in third and fourth data sets. The imposition of answer-options on the information product produces a polycentric information product, which is readily communicated to the care-giver or user of the present invention by oral, written or electronic means.

BRIEF DESCRIPTION OF THE DRAWINGS

The invention will be more fully understood and further advantages will become apparent when reference is made to the following detailed description of the preferred embodiments of the invention and the accompanying drawings wherein.

DESCRIPTION OF THE PREFERRED EMBODIMENTS

The present invention is directed to a method of providing a variety of answers to the numerous questions and issues related to child-rearing and development. The present invention may be tailored to a specific user or audience such as, for example, parents, teachers, grandparents, baby-sitters, children (e.g., toddlers, teens, etc.), etc. By considering numerous variables including geographic location and age of the child, the present invention can identify the topics most important to a specific user, prioritize these topics, and develop specific questions directed to each of the prioritized topics. The specific questions or issue-questions, are then presented to a panel of experts including child psychologists, psychiatrists, pediatricians, nurses, etc., to elicit answers from each expert for each issue-question. The issue-questions are also presented to a panel of parent-experts who each offer their opinion to the issue-question based on personal experience. The result is a plurality of perspectives or answer-options directed to each issue-question that are communicated to the user. The answer-options are preferably comprised of at least one expert opinion and at least one parent-expert opinion. The user thus benefits from the various views of the experts and parent-experts, and can consider the answer-options provided in addressing the specific issue that the user has identified as being important (based upon market research and other statistically gathered data).

The present invention may be used for production of a product series that includes, but is not limited to, television shows and video-tapes for caregivers and children, CD-ROMs, computer-based training ("CBT") products for caregivers and children, print publications including a newsletter, web pages (i.e., the world-wide web), and other now available or hereafter developed communication media and technology.

As used herein, the term caregiver refers to any person responsible for the care of a child, regardless of that person's relation to the child, the child's age and where the care is administered. The term parent-expert refers to persons identified as having actual experience with specific child-rearing and development issues, situations, etc., regardless of whether that person is in fact a parent. The terms child and children refer to persons between the ages of 0 and 18 years. The terms user and viewer are used herein to identify any person benefiting from the present invention.

Figure 1:
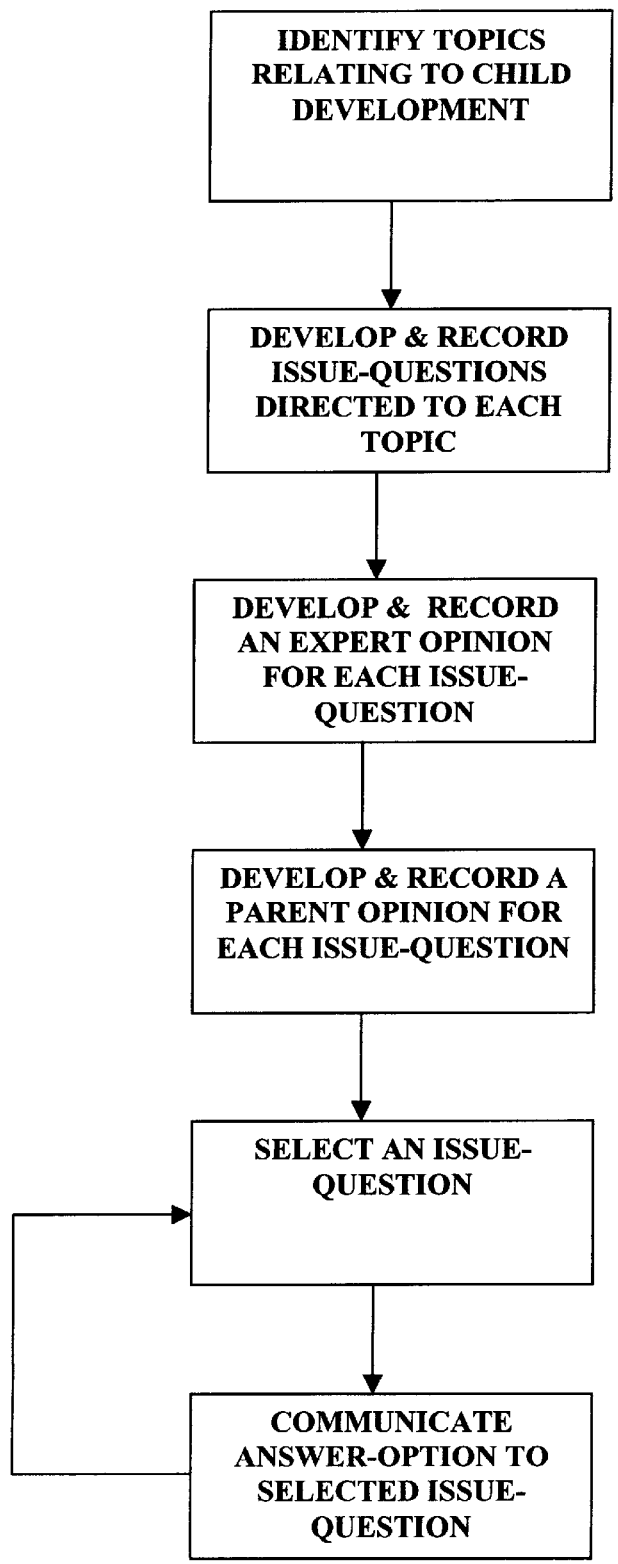
FIG. 1 is a flow diagram of the method of the present invention.

Referring now to the drawings, FIG. 1 is a flow diagram of a preferred embodiment of the present invention. A specific group of topics relating to child-rearing and development are first identified. The topics may include: 1) toddler issues; 2) child care choices; 3) surviving marriage with children; 4) non traditional families; 5) preventing accidents; 6) how to have a happy family; 7) preventing and recognizing child abuse; 8) mainstreaming a handicapped child; 9) working parents' guilt; 10) raising a socially conscious child (respect for others, and the environment); 11) ensuring good nutrition; 12) single parenting; 13) fathering today; 14) grandparenting today; 15) the middler years; 16) surviving the teen years; 17) sibling rivalry; 18) helping children deal with crisis (death, divorce); 19) raising a gifted child; 20) helping your child become a good student; 21) helping your child choose a successful career; 22) how to discipline with love; 23) raising street smart kids; 24) teaching the value of money; 25) families handling everyday stress; 26) building self-esteem; 27) dealing with infertility; and 28) relocating a family. It will be obvious to persons skilled in the art that these topics are merely illustrative, and that the topics considered by the present invention are limited only by the imagination of a routineer in the art. The group of topics may be identified using surveys of parents, focus groups, statistical data (i.e., data gathered by a third party directed to child-rearing and development), and various other information and data gathering sources and means.

Once the group of topics is identified, specific issue-questions directed to each topic are developed. These issue-questions may be developed using sources and means similar to those used for identification of the topics described above. The specific issues an intended audience will have for the various topics depends on factors such as audience composition (i.e., caregivers, children, etc.), age of the child, location of the family (i.e., city, suburb, country, etc.), socio-economic class of the family, and other factors. Thus, the specific questions must be developed by considering these and other variables so that the information provided by the present invention in the way of answer-options (described in more detail below) is meaningful and useful for the desired target audience, whether it be parents, grandparents, teachers, children, or whomever.

The issue-questions are then presented to a panel of experts in the field of child-rearing and development. The panel may include child psychologists, psychiatrists, pediatricians, nurses, teachers, and others having child-rearing and development experience and knowledge. Each expert provides his/her answer to the issue-question, thus providing a plurality of theoretical expert opinions as answer-options on the specific issue-question. Providing various perspectives on a single subject that is particularly important to the intended audience as previously identified by the development of topic groups and issue-questions, has heretofore not been available from a single source, as is the case with the present invention. Previously, persons having child-rearing and development questions must consult numerous sources of information to obtain the same quantum of information as provided by the present invention. In addition, the information provided by the present invention is specific in that it addresses those issues identified as being the most important to the target audience.

The issue-questions are also present to a panel of parent-experts who bring their practical experience to bear on the issues most important to audience. The parent-experts each provide his/her opinion on the issue-question, and collectively provide a variety of views and perspectives as answer-options on each issue-question. Thus, the expert panel provides primarily theoretical views and the parent-experts provide primarily practical views on the questions and issues identified as most important by the target audience. The opinions of the expert panel and parent-experts are provided as a plurality of answer-options that may be considered by the audience or user.

For the broadcast, video-tape and DVD mediums, the issue-questions can be presented to the expert and parent-expert panels in the form of a question and answer interchange conducted by a moderator. The experts and parent-experts can individually respond to the issue-question thus providing a plurality of answer-options that expose the audience to a plurality of views on a question that has particular relevance and importance to them. This question and answer format can be repeated until the topic if thoroughly explored.

Figure 3:
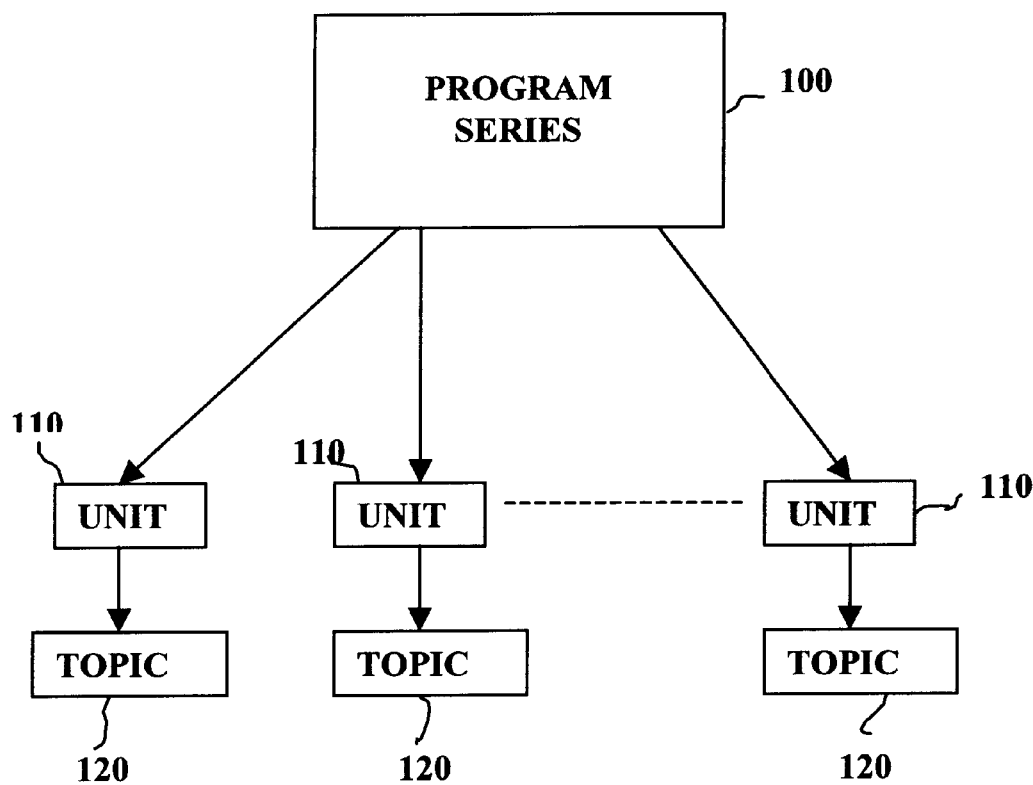
FIG. 3 is a block diagram of the components of a program series developed in accordance with the method of the present invention.

In a preferred embodiment, and with reference to FIG. 3, the present invention is used in the development of a program series 100 that can be broadcast on television, cable, pay-per-view, and the like, recorded on video-tape or digital-video disk (DVD), or stored on CD-ROM for use on a general purpose computer. The program series 100 includes a number of individual program units 1 10, with each program unit 110 addressing a specific topic 120 and fully exploring a broad range of issue-questions directed to that topic 120. For this embodiment, a program series 100 developed in accordance with the present invention will be comprised of a plurality of program units 110, each directed to a specific, single topic 120. Alternatively, the program series 100 may be comprised of a plurality of program units 110 that address a number of topics.

In a most preferred embodiment, the present invention is used in connection with the development and production of a television (network, cable, or otherwise) program format that regularly provides the described specific information.

Figure 2:
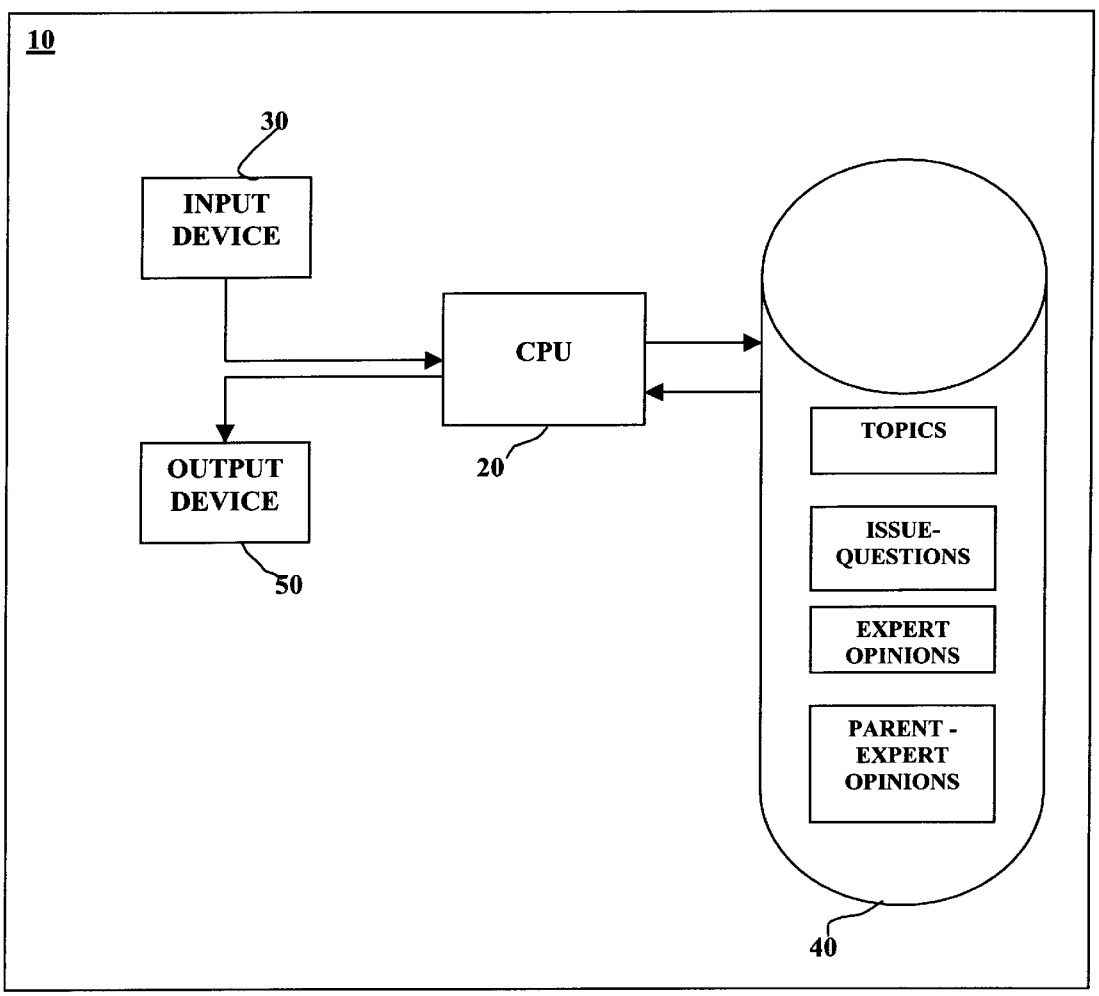
FIG. 2 is a block diagram of a general purpose computer on which the present invention may be operated.

For non-broadcast mediums such as CD-ROM and CBT, the present invention operates in connection with and on a general purpose computer 10, as depicted in FIG. 2. The computer 10 has a processor including a central processing unit (CPU) 20, an input device 30 such as a keyboard or mouse (including those integrally provided with laptop computers), a memory storage device 40 such as a hard disk unit (HDU), random access memory (RAM), or CD-ROM, and an output device 50 such as a computer monitor, printer, or modem. While the present invention operates in connection with and on a general purpose computer, it will be obvious to persons skilled in the art that the computer 10 in connection with which the present invention is used may contain additional components and peripheral devices.

Once the topic groups are identified, they are stored in the computer memory, preferably in a database on the HDU or CD-ROM. The issue-questions are also stored on the HDU or CD-ROM. The issue-questions are still presented to the expert panel and to the parent-expert panel to develop the various answer-options (i.e., expert opinions) on the issue-questions. These answer-options are recorded and also stored in a database on the HDU or CD-ROM. Using the input device 30, a user of the present invention first selects a specific topic from a list of topics, and then an issue-question from a list of "frequently asked questions" (i.e., FAQs) directed to the selected topic. The computer 10 retrieves the expert opinions and parent-expert opinions for the selected issue-question and communicates these opinions to the computer output device 50 as answer-options for consideration by the user. The user may then select another topic, or another issue-question directed to the previously selected topic. The answer-options may be presented in a variety of formats including text only, text and non-animated graphics, text and animated graphics, text and video, video and audio, and various other formats.

Obviously, not every use is interested in the same topics and questions. Issues important to the parents of a toddler will not be the same issue that are important to a teenager. The present invention provides an input mask that consists of criteria entered by the user and that identifies the specific needs and interests of that particular user. The input mask will consider the criteria and operate as a filter or overlay to the various data stored in the database. Thus, user-specific information can be retrieved to provide an information product in the form of answer-options that are directed specifically to the user. Information entered by the user, including the user's age and geographic location, are used to comprise the input mask so that only information directed to the specific user's child-rearing and development needs is provided. The user may also select which answer-options should be provided, e.g., all answer-options, experts only, parent-experts only, etc. Thus, the information product provided by the present invention is customizable by the user and may be tailored to address those issues identified by the user as the most important. The user may enter criteria for the input mask either before or after selecting a specific issue-question.

While the user may identify a specific issue, he/she may not know what questions to ask. The input mask of the present invention may operate as a query tool to assist the user in identifying specific questions. For example, a parent may have a toilet-training issue for a four-year old. The answer-options for this parent are distinctly different than those for the parent of a two-year old. Thus, the parent can enter the child's age as a variable criterion for the input mask and the present invention will consider this information when querying the stored information (e.g., issue-questions, expert opinions and parent-expert opinions) to retrieve only that information directed to this specific parent's concern with his/her four-year old.

Although not yet available, interactive television will provide another medium for the implementation of the present invention. Interactive television will provide a means by which viewers can interactively pose questions to the experts and to the parent-experts, who will, in turn, provide a plurality of answer-options in the form of their respective opinions on the issue-question. In this way, information provided by the present invention is specifically directed to the viewer and thus has particular relevance, importance, and value.

Information provided in accordance with the present invention may also be communicated via a customized newsletter. Specific information including the child's birth-date may be used to provide information to the user specifically directed to issues for that particular child's development. The newsletter would also include the numerous opinions of the experts and parent-experts to provide various answer-options to the user.

By taking into account the variables that determine which topics and issues are most important to caregivers and children (e.g., child's age, location of the family (i.e., city, suburb, country, etc.), socio-economic class of the family, etc.), and by considering these variables when identifying the topic groups and issue-questions, the present invention provides a method of providing information to a user, viewer, caregiver, child, etc. that is specifically directed to their immediate and pressing concerns. In other words, the information provided by the present invention is tailored to its audience. Information of this specificity has heretofore been unavailable. Significantly, the information provided by the present invention is polycentric, in that it provides numerous viewpoints (i.e., answer-options) on the topics and issues that have been identified as being most important to the target audience.

Having thus described the invention in rather full detail, it will be recognized that such detail need not be strictly adhered to but that various changes and modifications may suggest themselves to one skilled in the art, all falling within the scope of the invention, as defined by the subjoined claims.

What is claimed is:

1. A method of providing to a user a plurality of answer-options to an issue-question relating to child development, in a computer having a processor, an input device, a memory storage device and an output device, said method comprising the steps of:
   (a) identifying and storing in the memory storage device a plurality of topics relating to child development;
   (b) developing and storing in the memory storage device a plurality of issue-questions directed to each of the stored topics,
   (c) developing and storing in the memory storage device an expert opinion for each issue-question;
   (d) developing and storing in the memory storage device a parent-expert opinion for each issue-question;
   (e) selecting, by the user via the input device, a topic;
   (f) selecting, by the user via the input device, an issue-question directed to the selected topic; and
   (g) providing to the computer output device a plurality of answer-options to the selected issue-question, the plurality of answer-options comprising at least one expert opinion and one parent-expert opinion, and forming a response that is polycentric and tailored to said issue-question.

2. A method as recited by claim 1, wherein said step (a) comprises gathering data relating to child development from a plurality of sources including survey data and focus group data and storing the gathered data in the memory storage device.

3. A method as recited by claim 1, wherein said step (b) comprises gathering data relating to child development from a plurality of sources including survey data and focus group data and storing the gathered data in the memory storage device.

4. A method as recited by claim 1, wherein said step (c) comprises presenting each issue-question to an expert and storing the expert's answer in the memory storage device.

5. A method as recited by claim 1, wherein said step (d) comprises presenting each issue-question to a parent-expert and storing the parent-expert's answer in the memory storage device.

6. A method of providing a plurality of answer-options to an issue-question relating to child development, said method comprising the steps of:

(a) identifying a plurality of topics relating to child development based upon predetermined criteria;

(b) developing and recording a plurality of issue-questions directed to each of the identified child development topics;

(c) developing and recording an expert opinion for each issue-question;

(d) developing and recording a parent-expert opinion for each issue-question;

(e) selecting a topic;

(f) selecting an issue-question directed to the selected topic; and (g) communicating a plurality of answer-options to the selected issue-question, the plurality of answer-options comprising at least one expert opinion and one parent-expert opinion and being communicated orally, in writing, or electronically, said answer options providing a response that is polycentric and tailored to the issue-question.

7. A method as recited by claim 6, wherein said step (a) comprises gathering data relating to child development from a plurality of sources including survey data and focus group data.

8. A method as recited by claim 6, wherein said step (b) comprises gathering data relating to child development from a plurality of sources including survey data and focus group data.

9. A method as recited by claim 6, wherein said step (c) comprises presenting each issue-question to an expert.

10. A method as recited by claim 6, wherein said step (d) comprises presenting each issue-question to a parent-expert.

11. A method as recited by claim 6, wherein said step (g) further comprises broadcasting the plurality of answer-options using a television medium.

12. A method as recited by claim 6, wherein said step (g) further comprises recording the plurality of answer-options on a video-tape.

13. A method as recited by claim 6, wherein said step (g) further comprises recording the plurality of answer-options on a DVD.

14. A method of providing to a user of said program a polycentric information product concerning a child development issue, in a computer having a processor, an input device, a memory storage device and an output device, said method comprising the steps of:

(a) developing and recording in a database on the memory storage device a first data set containing a plurality of topics relating to child development;

(b) developing and recording in said database a second data set containing a plurality of issue-questions directed to each of said topics;

(c) developing and recording in said database a third data set containing an expert opinion for each issue-question;

(d) developing and recording in said database a fourth data set containing a parent-expert opinion for each issue-question;

(e) selecting from said data base, by the user via the input device, a topic;

(f) selecting from said data base, by the user via the input device, an issue-question pertinent to at least one selected topic, said selected topic and issue-question comprising a primary information product;

(g) modifying said primary information product by imposing thereon a plurality of answer-options to the selected issue-question, the plurality of answer-options comprising at least one expert opinion and one parent-expert opinion to thereby produce a polycentric information product tailored to said issue-question; and (h) communicating to the user via the computer output device said polycentric information product by oral, written or electronic means.

15. A method as recited by claim 14, wherein said step (a) comprises gathering data relating to child development from a plurality of sources including survey data and focus group data and storing the gathered data in the memory storage device.

16. A method as recited by claim 14, wherein said step (b) comprises gathering data relating to child development from a plurality of sources including survey data and focus group data and storing the gathered data in the memory storage device.

17. A method as recited by claim 14, wherein said step (c) comprises presenting each issue-question to an expert and storing the expert's answer in the memory storage device.

18. A method as recited by claim 14, wherein said step (d) comprises presenting each issue-question to a parent-expert and storing the parent-expert's answer in the memory storage device.

19. A method of providing to a user a plurality of answer-options comprised of an expert opinion and a parent-expert opinion on an issue-question and relating to child development, the answer-options, expert opinion, parent-expert opinion, and issue-questions being stored in a memory storage device of a computer having a processor, an input device, and an output device, said method comprising the steps of:

(a) selecting, by the user via the input device, a topic from a list of topics stored in the memory storage device;

(b) constructing an input mask by entering, by the user via the input device, a variable criterion;

(c) identifying a plurality of issue-questions that satisfy the variable criterion using the input mask;

(d) identifying a plurality of answer-options to the identified issue-questions; and (e) providing to the computer output device the plurality of answer-options, said answer options providing a response which is polycentric and tailored to said issue question.

20. A method as recited by claim 19, wherein said step (b) comprises entering, by the user, information specific to the user including a child's age and the user's geographic location.

* * * * *